UNITED STATES PATENT OFFICE.

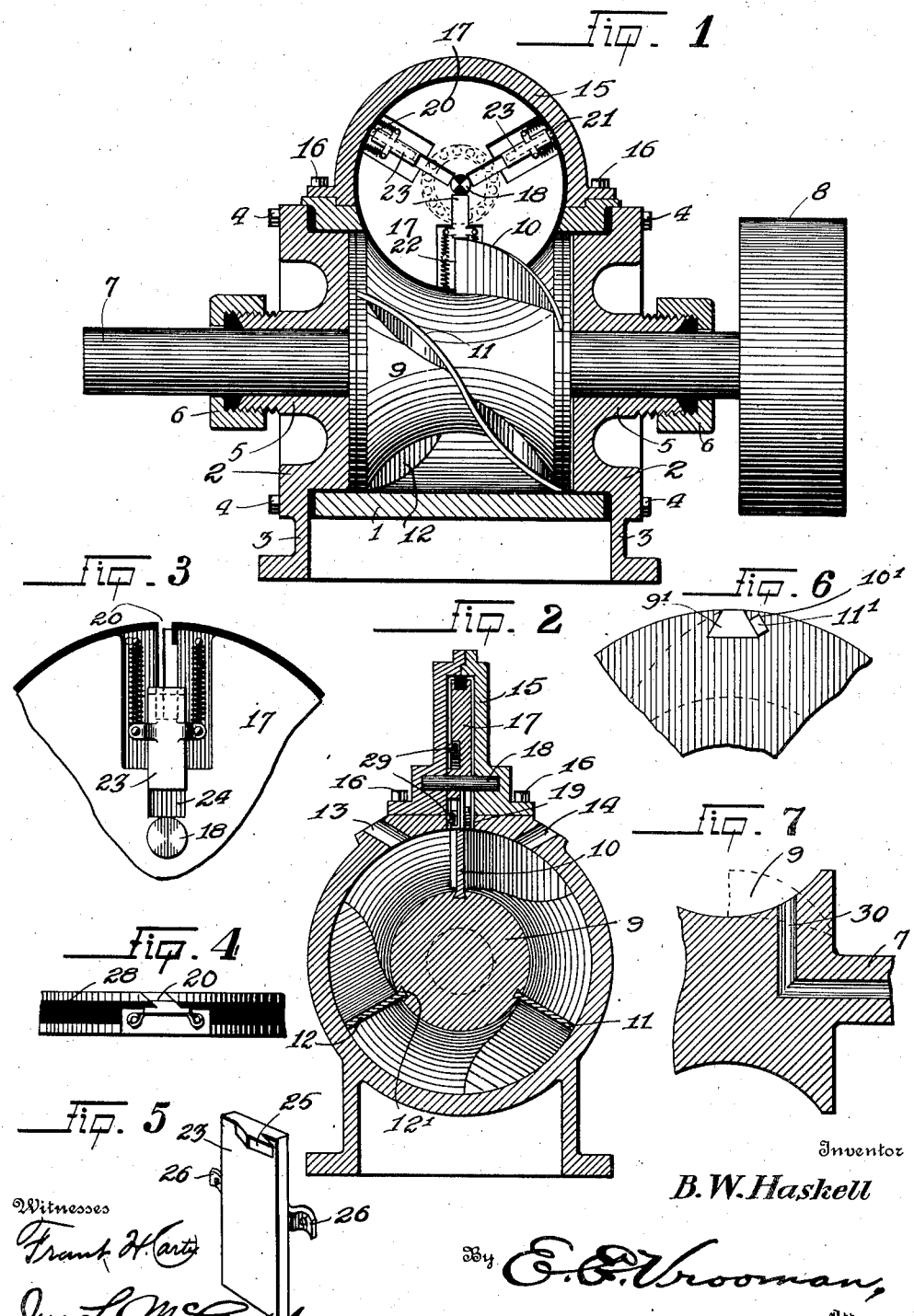

BYRON W. HASKELL, OF OAKLAND, CALIFORNIA.

PUMP.

983,365.  Specification of Letters Patent.  Patented Feb. 7, 1911.

Application filed January 29, 1910. Serial No. 540,841.

*To all whom it may concern:*

Be it known that I, BYRON W. HASKELL, a citizen of the United States, residing at Oakland, in the county of Alameda and State of California, have invented certain new and useful Improvements in Pumps, of which the following is a specification.

This invention relates to pumps, and has special reference to the construction and arrangement of the piston of the pump and parts connected therewith, whereby a constant flow of liquid may be maintained through the cylinder of the pump. A piston in the form of a spiral or screw is provided which is connected with a movable, rotatable member whereby liquid is caused to flow from the intake pipe about said screw and to be directed to the discharge pipe.

The invention has for its object to provide a pump of this general description which will efficiently conduct the liquid from the intake pipe to the discharge pipe.

The invention further has for its object to provide a movable member in connection with the spiral or screw-shaped piston which may be readily removed for cleaning or other purposes.

In carrying out the objects of the invention generally stated above, it will, of course, be understood that the essential features thereof are susceptible of changes in details and structural arrangements, one practical and preferred embodiment of which is shown in the accompanying drawings, wherein—

Figure 1 is a view of a pump, in central longitudinal section and showing the piston in full lines, constructed in accordance with this invention. Fig. 2 is a transverse sectional view of the invention. Fig. 3 is an enlarged detail view of a portion of the disk employed in connection with the piston for governing the flow of liquid about the piston. Fig. 4 is a plan view of the portion of the disk referred to in Fig. 3. Fig. 5 is a perspective view of one of the slides employed in connection with the disks shown in Fig. 3. Fig. 6 is an enlarged detail view in transverse section of a portion of the piston showing the means for securing the blades to the piston. Fig. 7 is an enlarged detail view in transverse section of a portion of the piston showing a modification of the inlet and outlet ports.

In carrying out the invention, the pump is constructed with a cylindrical portion 1 provided with heads 2, each having a base portion 3, said heads 2 being bolted to the cylindrical portion 1 by means of bolts 4. The heads 2 are provided with bearings 5 and stuffing boxes 6. A shaft 7 extends through said stuffing boxes and bearings and has mounted on one end suitable means for driving the shaft 7, as, for instance, a band wheel 8 which may be connected with any suitable source of power. Mounted upon the piston shaft 7 in the cylinder is a piston 9 consisting of a solid longitudinally-curved portion provided with transverse dovetail slots 9', each of said slots 9' having an adjacent slot 10' opening into said slot 9' by means of which curved spiral blades 10—11—12 provided with dovetail heads 12' are secured in said dovetail slots 9' and fastened in place by a key or pin 11'. As shown in Fig. 1, the spiral blades 10—11—12 extend diagonally across the body portion of the piston 9 from end to end thereof, said spiral blades 10—11—12 curving toward each end to a narrow point.

The cylinder is provided with an inlet port 13 and an outlet port 14 on opposite sides thereof, with which ports may be connected suitable conducting pipes. Mounted on the top of the cylinder is a casing 15, preferably formed in sections and bolted to the top of the cylinder by means of bolts 16, said casing extending lengthwise of the cylinder. Partly located within said casing 15 and pivoted therein by means of a pivot pin or shaft 18 is a rotary disk 17 projecting down into the cylinder through an opening 19 and having one edge thereof arranged closely against the body portion of the piston 9, as shown in Fig. 1.

The disk 17 is provided with a number of radial slots 20—21—22 which extend to the edge of the disk and are open at that point. Each of said slots 20—21—22 is provided with a slide 23 which has its rear end projecting into and movable in a groove 24 in the face of the disk, and has at one end a projection 25 which overlaps the edge of each slot 20—21 or 22. The joints between said slides and said slots 20, 21 and 22 are suitably packed to prevent leakage. The disk 17 has a periphery provided with a suitable packing 28 to form a tight joint in the casing 15. The disk 17 is provided with ball bearings 29 to prevent binding of the disk against the sides of the casing.

In lieu of the inlet and outlet ports 13 and 14, a modified form of inlet and outlet ports may be employed by means of the passageway 30 which extends through the body portion of the piston 9 and through the shaft 7, as shown in Fig. 7.

The operation of the pump is as follows: Shaft 7 being rotated by suitable power applied thereto, the spiral blades 10, 11 and 12 will be successively carried through the disk 17 as the body portion 9 of the piston rotates. The narrow point of each spiral blade 10, 11 and 12 as it revolves adjacent to the disk 17 engages beneath the end of each slide 23 and moves it backward into the groove 24, as shown in Fig. 1. The spiral blade at the same time causes the disk 15 to revolve and as the spiral blade passes through the disk 15 thus causes the second slot to be brought into position for the engagement of the succeeding spiral with the slide terminating at said slot.

It will be seen that by means of the disk 15, the circulating liquids entering into the inlet port 13 will be caused to be carried about the piston 9 and conducted to the other side of the piston 9 to the outlet port 14. By this means, a steady and regular flow of the circulating liquid is obtained from the inlet port to the discharge port, and the piston will be caused to rotate uniformly.

What I claim as my invention is:—

1. In a pump of the character described, a cylinder, a rotary piston having spiral blades, and a rotary disk projecting into said cylinder bearing against said piston and having openings with movable covers adapted to be engaged by said spiral blades, said rotary disk being located between the inlet and outlet ports of the cylinder.

2. In a pump of the character described, a cylinder, a rotary piston curved longitudinally and having spiral blades extending diagonally from end to end of said cylinder and spaced apart from each other, a casing mounted on said cylinder, a rotary disk mounted in said casing and having radial openings, movable slides covering said openings and adapted to be engaged by said spiral blades successively and be automatically closed when said blades have passed through the disks.

3. In a pump of the character described, a cylinder having inlet and outlet ports, a casing mounted on said cylinder, a rotary disk pivoted within said casing and projecting into said cylinder and having radial slots, slides covering said slots; a rotary piston mounted in said cylinder and being curved longitudinally having spiral blades extending diagonally from end to end of said cylinder and spaced from each other, and adapted to successively enter said slots in the rotary disk and raise said slides and bring said slides successively into position for engagement with a spiral blade on the piston, said rotary disk separating the inlet and outlet ports and causing the circulating liquid to flow about the piston.

4. In a pump of the character described, a cylinder, a rotary piston consisting of a body portion curved longitudinally, spiral blades on said body portion spaced apart from each other and extending diagonally from end to end of said piston tapering to a narrow point at each end, a casing mounted on the piston, a rotary disk in said casing having radial slots each having an open end at the periphery of the disk, a slide covering each slot, reacting springs connecting said slides to said disk and normally holding said slides in closed position, said disk separating the inlet and outlet ports and adapted to be successively engaged by said spiral blades passing through said slots in the disk and raising and lowering said slides covering the slots.

In testimony whereof I affix my signature in presence of two witnesses.

BYRON W. HASKELL.

Witnesses:
H. C. SCHROEDER,
F. P. SCHROEDER.